United States Patent [19]

Siffrin

[11] Patent Number: 4,670,623
[45] Date of Patent: Jun. 2, 1987

[54] EDIFICE FOR CONFINEMENT OF EQUIPMENT IN MINES AND THE LIKE

[75] Inventor: Horst Siffrin, Merchweiler, Fed. Rep. of Germany

[73] Assignee: Walter Becker GmbH, Friedrichsthal, Fed. Rep. of Germany

[21] Appl. No.: 772,643

[22] Filed: Sep. 5, 1985

[30] Foreign Application Priority Data

Sep. 10, 1984 [DE] Fed. Rep. of Germany ....... 3433169

[51] Int. Cl.$^4$ .......................... H05K 5/04; E04H 9/16
[52] U.S. Cl. ...................................... 174/50; 52/79.4; 52/169.6; 220/4 R
[58] Field of Search ................. 174/50, 17 R; 52/79.1, 52/79.4, 79.5, 169.6; 109/1 S; 336/90; 220/4 R, 4 F

[56] References Cited

U.S. PATENT DOCUMENTS 3,168,777 2/1965 DeRidder et al. ............ 174/17 R X
3,972,437 8/1976 Lovich et al. .................. 220/4 R X

FOREIGN PATENT DOCUMENTS 1288667 2/1969 Fed. Rep. of Germany ........ 174/50

Primary Examiner—Arthur T. Grimley
Assistant Examiner—D. A. Tone
Attorney, Agent, or Firm—Peter K. Kontler

[57] ABSTRACT

A pressurized cabin for temporary or permanent confinement of electrical equipment in mines has one or more octagonal units and two sidewalls flanking the unit or units. Each unit is assembled of four sections each having a longer panel and a shorter panel, as considered in the circumferential direction of the respective unit, and the two panels of each section make an acute angle. The marginal portions of all sections are provided with borders which extend into the interior of the respective unit and are secured to each other, to the neighboring units and/or to the sidewalls by screws or bolts and nuts. Two of the longer panels in each unit are horizontal and the other two longer panels are vertical. The shorter panels have openings for the passage of pneumatic or hydraulic conduits and/or one or more electric cables. Such shorter panels can carry pressure relief and/or pressure reducing valves, or they can be connected to columns which mount the respective unit of a platform. The conduits or cables pass through plate-like closures which are sealingly secured to and overlie the openings in some or all of the shorter panels in a single unit or in each of two or more units.

20 Claims, 6 Drawing Figures

EDIFICE FOR CONFINEMENT OF EQUIPMENT IN MINES AND THE LIKE

BACKGROUND OF THE INVENTION

The present invention relates to edifices in the form of cabins or shelters. More particularly, the invention relates to improvements in edifices which can be used with advantage for temporary or more or less permanent storage of electrical and/or other equipment in mines and/or other types of underground excavations. Still more particularly, the invention relates to improvements in preferably fluidtight shelters or cabins for transformers, thyristors and/or other types of electrical or electronic equipment which must or should be surrounded by a fluid (particularly air) at a pressure exceeding that of the surrounding atmosphere.

OBJECTS AND SUMMARY OF THE INVENTION

An object of the invention is to provide an edifice in the form of a cabin or shelter which consists of a relatively small number of parts, which can be rapidly assembled or dismantled at the locale of use, and which can be designed to stand the anticipated stresses in a mine or the like.

Another object of the invention is to provide an edifice which can be transported in fully assembled condition and which can be designed to permit for leakage-free introduction of conduits for gaseous and/or hydraulic fluids and/or electrical conductors.

A further object of the invention is to provide an edifice whose dimensions can be selected practically at will and whose constituents can be taken apart and reused at other locations or combined with additional constituents to form larger edifices.

An additional object of the invention is to provide a novel and improved method of assembling an edifice for confinement of underground transformers and/or other electrical or electronic equipment.

Still another object of the invention is to provide an edifice which can be assembled or taken apart by semi-skilled or unskilled workers and whose assembly or dismantling merely necessitates the use of readily available tools.

A further object of the invention is to provide an edifice which can be reinforced in a simple but efficient way to stand the stresses in an underground excavation, even in the event of partial or extensive collapse of the ceiling thereabove.

Another object of the invention is to provide an edifice which can be dimensioned to afford access to workmen and can embody all safety features which are necessary for underground operations.

The invention is embodied in an edifice which can constitute a pressurized cabin for confinement of permanently or temporarily installed electrical equipment in mines and other types of underground excavations. The edifice comprises at least one circumferentially complete (preferably substantially octagonal) unit having four neighboring sections each of which comprises a longer panel and a shorter panel (as considered in the circumferential direction of the unit). The panels of each section make acute angles and the shorter panel of each section is adjacent to the longer panel of one neighboring section. Each of the sections has a marginal portion which is provided with a preferably circumferentially complete border, lip or rim extending to one side of the respective section. The borders of neighboring sections have portions which are immediately or closely adjacent to each other, and the edifice further comprises means (e.g., screws, nuts and bolts or other suitable fasteners) for separably or even permanently securing such portions of the borders of neighboring sections to each other. The dimensions of the shorter panels of all four sections are preferably identical and each border preferably extends circumferentially around the entire section.

The edifice preferably further comprises two sidewalls which flank the one unit and, if the edifice comprises a single unit, are bolted, screwed or otherwise reliably secured to the adjacent portions of the borders of all four sections of the one unit.

The edifice can comprise a second unit which is adjacent to one side of the one unit, and the borders of the sections of the two units have second portions which are adjacent to and secured to each other by screws, bolts or other suitable fasteners. The one unit can be disposed between two additional units and the sidewalls then flank the assembly of the three units and are secured to the corresponding additional units. The sections of the second unit (or each additional unit) are preferably inverted through 180 degrees with reference to the sections of the one unit. Thus, the shorter panels of sections in the one unit can be located ahead of the respective longer sections, as considered in the circumferential direction of the one unit, and the shorter panels of the second unit (or each additional unit) are then located behind the respective longer panels, as considered in the same circumferential direction of the one unit.

The shorter panel of at least one of the sections in the one unit (or in each unit) can have an opening, and such edifice then preferably further comprises a closure (e.g., a metallic plate) which overlies the opening and means (e.g., screws, bolts and nuts or other suitable fasteners) for securing the closure to the respective shorter panel. A seal can be interposed between the closure and the respective shorter panel to prevent leakage of fluids through the opening. The edifice can comprise a cable which extends through the closure and a fluidtight seal between the closure and the cable (such seal surrounds the cable and is secured to the closure). The edifice can also comprise a pneumatic or hydraulic conduit which extends through the closure, and a fluidtight seal between the closure and the conduit (such seal surrounds the conduit and is provided on (e.g., separably or permanently secured to) the closure. Still further, the closure can be connected to a column or another suitable support which is located externally of the respective unit and can serve to mount the unit on a platform in an underground excavation.

The inner sides of at least two shorter panels in the one unit or in at least one of two or more units can be provided with triangular brackets or otherwise configurated supports for a substantially plate-like partition (e.g., a horizontal or substantially horizontal floor) in the interior of the respective unit or units. The supports are located in the interior of the respective unit, and the longer panel of one section of the respective unit or each unit can be located at a level below and can be spaced apart from the partition. Each support can include two halves which are mirror symmetrical to each other with reference to a plane including the center of the respective shorter panel.

The dimensions of two longer panels in each of the units can deviate from the dimensions of the other two panels in the same unit. For example, each unit (which is properly installed in a mine or the like) can have two horizontal longer panels and two vertical longer panels, and the length of the horizontal panels (as considered in the circumferential direction of the respective unit) can exceed the length of the vertical panels (or vice versa).

The novel features which are considered as characteristic of the invention are set forth in particular in the appended claims. The improved edifice itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
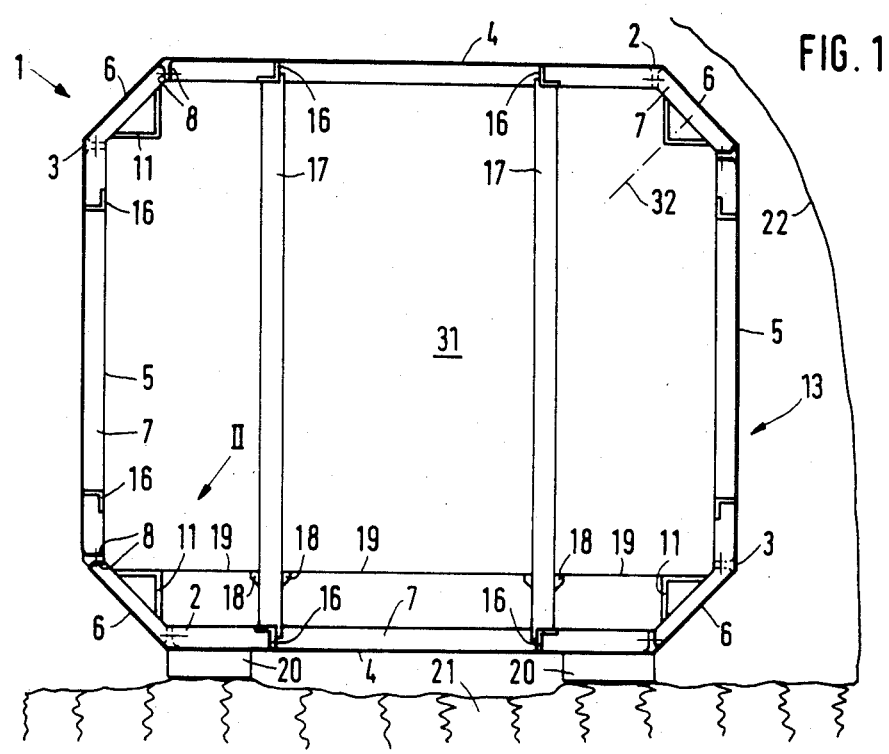
FIG. 1 is a schematic elevational view of an edifice in the form of a cabin which embodies one form of the invention, with one of the sidewalls removed.

FIG. 1 shows one unit 13 of an edifice 1 (hereinafter called cabin) which is mounted on two flat horizontal beams 20 in an underground excavation, e.g., a mine whose floor is shown at 21. The unit 13 comprises two identical sections 2 and two identical sections 3. The four sections together form a circumferentially complete structure which resembles a regular octagon. The longer panels of the sections 2 are shown at 4, and the shorter panels of the sections 2 are shown at 6. Each of the panels is rectangular and the length of the illustrated panels 4 is several times the length of the corresponding panels 6, as considered in the circumferential direction of the unit 13. The longer panels 5 of the two sections 3 are slightly shorter than the panels 4, and the dimensions of the shorter panels 6 of the sections 3 are identical with those of the similarly referenced shorter panels of the sections 2. The longer panels 4 of the sections 2 are substantially horizontal, and the longer panels 5 of the sections 3 are substantially vertical. Each panel 6 makes with the respective longer panel 4 or 5 an angle of approximately or exactly 45 degrees. It will be noted that the shorter panel 6 of each section 2 is adjacent to the longer panel 5 of the neighboring section 3, and that the shorter panel 6 of each section 3 is adjacent to the longer panel 4 of the neighboring section 2. In other words, the four shorter panels 6 alternate with the four longer panels 4 and 5, and the longer panels 4 alternate with the longer panels 5, as considered in the circumferential direction of the unit 13. The latter is disposed between two sidewalls 31 only one of which can be seen in FIG. 1. The width of each section (2 or 3), as considered at right angles to the plane of FIG. 1, is the same. The dimensions of the sections 2 and 3 can be selected in such a way that the erected cabin 1 enables a grown person to enter its interior in fully erected position.

The marginal portions of the sections 2 and 3 are bent to form elongated borders, edges or lips each of which extends to one side of the respective section, namely toward the interior of the unit 13. The longitudinally extending portions of the borders are shown at 7, and the transversely extending portions of such borders are denoted by the characters 8. The portions 8 extend at right angles to the plane of FIG. 1, and the portions 7 are located in or are parallel to the plane of this Figure. The portions 7 of the borders extend at right angles to the planes of the major or central portions of the respective panels 4, 5 and 6, those portions 8 which are provided at the free ends of the longer panels 4 and 5 also make right angles with the general planes of such panels, and the border portions 8 on the shorter panels 6 make angles of 45 degrees with the major portions of the respective panels 6 (see FIGS. 3–6). This renders it possible to place the border portion 8 of a panel 4 or 5 flush against the border portion 8 of the adjoining panel 6. The width of the border portions 8 is preferably the same as that of the border portions 7.

Some or all of the panels 6 are formed with rectangular openings or windows 9 (see FIGS. 2–6) which are flanked by rows of holes 10 for the passage of the shanks of screws, bolts or analogous fasteners 24 (see FIGS. 3–6). The rows of holes 10 extend along the longer sides of the respective openings 9, and the shorter sides of such openings are adjacent to the respective legs of substantially V-shaped or L-shaped supports or bracket 11 (not shown in FIG. 2). Each bracket 11 preferably comprises two halves which are mirror symmetrical to each other with reference to a plane 32 (see the upper right-hand portion of FIG. 1) which extends through the center of the respective shorter panel 6. The dimensions of all openings 9 are preferably the same, and this preferably also applies for the brackets 11.

Figure 2:
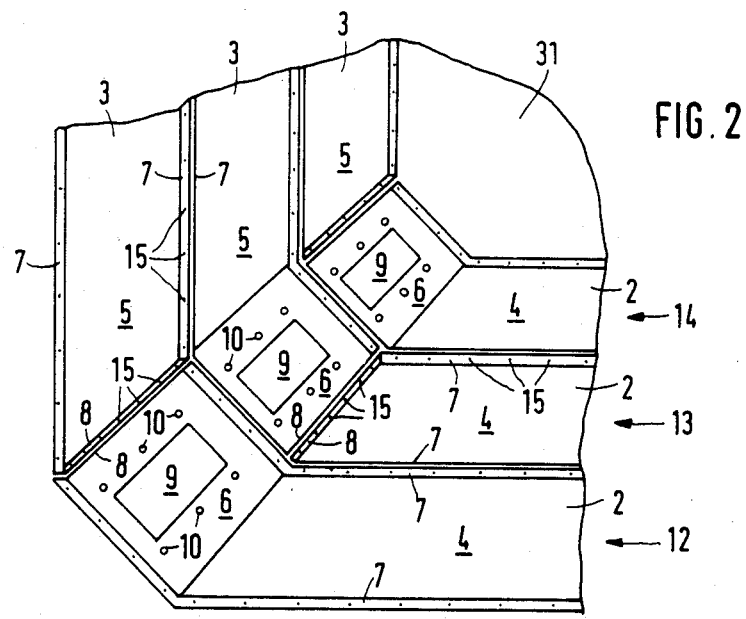
FIG. 2 is a fragmentary perspective view as seen in the direction of arrow II in FIG. 1, showing three units of the cabin next to each other.

FIG. 2 shows portions of three neighboring units 12, 13 and 14. The units 12 and 14 flank the unit 13 of FIG. 1 and are flanked by the two sidewalls 31 (only one shown in FIG. 2). The three panels 4 which are shown in FIG. 2 are horizontal, and the three panels 5 which are shown in FIG. 2 are vertical. The border portions 7 of neighboring units 12, 13 and 13, 14 are secured to each other by bolts, screws or analogous fasteners 15, and suitable sealing strips and/or sealing compounds can be confined between the neighboring border portions 7 to prevent or to greatly reduce the flow of fluids between the interior and the exterior of the cabin. The sidewalls 31 are secured to the border portions 7 of the units 12 and 14 by fasteners corresponding to those which are shown at 15.

The longer panels 4 constitute the floor and the bottom of the cabin, and the longer panels 5 constitute the vertically extending (lateral) walls which alternate with the sidewalls 31. The shorter panels 6 form the bevels between the outer sides of the neighboring longer panels 4 and 5.

The sections 2 and 3 of the median unit 13 of FIG. 2 are inverted by 180 degrees with reference to the sections 2 and 3 of the neighboring additional units 12 and 14. As can be seen in FIG. 2, the left-hand end of the longer panel 4 of the lower section 2 of the unit 13 is adjacent to the righthand end of the panel 6 of the section 3 in the unit 13. On the other hand, the lower end of the panel 5 in the unit 12 or 14 of FIG. 2 is adjacent to the left-hand end of the panel 6 forming part of the section 2 of the respective unit 12 or 14. Otherwise stated, the panels 6 in the unit 13 of FIG. 2 are located in front of the respective panels 4 and 5, as considered in a clockwise direction, whereas the panels 6 of the sections 2 and 3 in the units 12 and 14 of FIG. 2 are located behind the respective panels 4 and 5, again as considered in the clockwise direction.

The marginal portions of the sidewalls 31 may but need not extend outwardly beyond the adjacent portions 7 of the borders on the panels of the sections 2 and 3 which form the additional units 12 and 14. One of the sidewalls 31 is preferably provided with a gate (not specifically shown) which serves as a means for affording access to as well as for providing exit from the interior of the assembled cabin. As mentioned above, the spaces between the portions 7 and 8 of the borders on neighboring panels (in each of the units 12, 13 and 14 as well as between such units) are preferably filled with a sealing compound and/or contain sealing strips to thus ensure that the fasteners 15 or analogous securing means can establish fluidtight seals between the neighboring sections of a given unit, between the neighboring units as well as between the unit or units and the sidewalls 31.

The upper and lower panels 4 of the unit 13 shown in FIG. 1 are provided with internal profiles 16 (e.g., L-shaped irons). The height of each of these profiles preferably equals the width of the portions 7 or 8 of the borders on the sections 2 and 3. Each of the profiles 16 is preferably a tight fit between the border portions 7 of the corresponding panel 4, and the horizontal legs of these profiles are adjacent to and clampingly engage the respective ends of upright props 17 which reduce the likelihood of collapse of the roof of the cabin 1 even if the ceiling of the mine above the roof (i.e., above the upper section 2) collapses while the cabin is located in the interior of the mine. The profiles 16 and/or the props 17 can further serve to support or to maintain in selected positions certain equipment (e.g., transformers, thyristors or the like) in the interior of the cabin 1. The brackets 11 at the inner sides of the panels 6 can serve a similar purpose. In addition, the two lower brackets 11 of FIG. 1 support the underside of a plate-like partition or floor 19 which is further supported by lateral protuberances 18 of the props 17. The equipment which is stored in the cabin can rest on the floor 19. The protuberances 18 can constitute horizontal bars or rods which extend transversely of the cabin (i.e., between the two sidewalls 31) and ensure proper and reliable retention of the floor 19 at a selected level. The part 22 which is shown in FIG. 1 can constitute the face of a mine, i.e., the length of the mine is increased by removing material from the face 22. The cabin can be shifted in a direction to the left (as viewed in FIG. 1) at desired intervals or is more or less permanently installed at the illustrated locale.

FIG. 1 shows that the inner sides of the panels 5 are also provided with substantially L-shaped transversely extending profiles 16.

Figure 3:
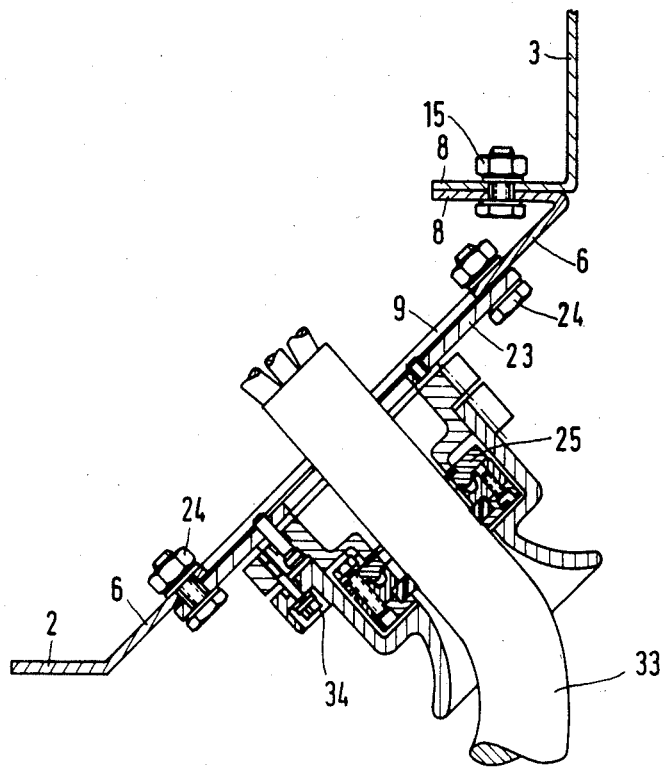
FIG. 3 is an enlarged view of one corner portion of the median unit, showing the manner in which an electric cable is led through the shorter panel of one of its sections.

FIG. 3 shows the lower right-hand corner of a unit (e.g., of the median unit 13 of FIG. 2). A plate-like closure 23 is secured to the outer side of the corresponding shorter panel 6 by two rows of bolts and nuts 24 or other suitable fasteners which extend through the aforementioned holes 10 at the longer sides of the opening 9 in the section 6. The border portion 8 of this panel is secured to the border portion 8 of the adjacent panel 5 by fasteners 15. A cable 33 which passes through the closure 23 and the opening 9 of the panel 6 shown in FIG. 3 is surrounded by a seal 25 which is of conventional design. This seal surrounds the cable 33 at the outer side of and is mounted on the closure 23. The illustrated seal 25 comprises two parts which are telescoped into each other and are held together by a set of screws 34. Other types of seals for the cable 33 can be used with equal or similar advantage.

Figure 4:
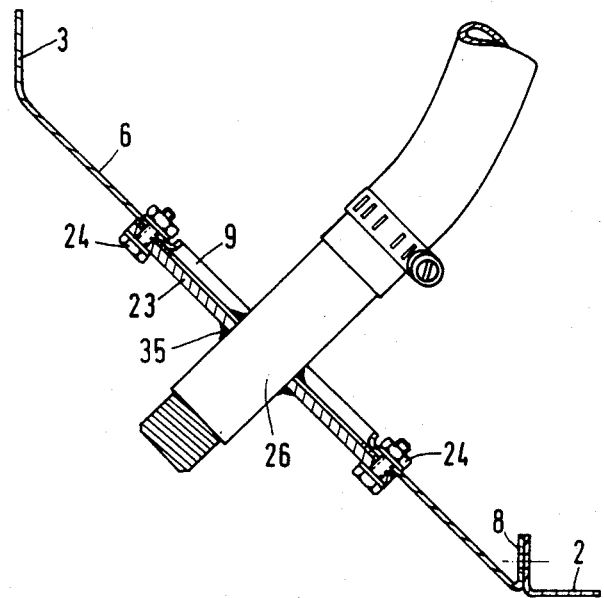
FIG. 4 is an enlarged view of another corner portion of the median unit, showing the manner in which a pneumatic or hydraulic conduit is caused to pass through the shorter panel of another of its sections.

FIG. 4 shows the panel 6 in the lower left-hand portion of the intermediate unit 13 of FIG. 2. The closure 23 is traversed by a hydraulic or pneumatic conduit 26 which serves to admit a fluid into or to evacuate a fluid from the interior of the assembled cabin. The manner in which the closure 23 of FIG. 4 is secured to the panel 6 in order to seal the opening 9 is the same as shown in FIG. 3. A suitable sealing compound and/or a sealing strip is preferably inserted between the closure 23 and the outer side of the panel 6. The seal which surrounds the conduit 26 and is provided at the outer side of the closure 23 of FIG. 4 is a welded seam 35. For example, the conduit 26 of FIG. 4 can serve as a means for supplying water to transformers, thyristors and/or other components or pieces of equipment in the interior of the cabin.

Figure 5:
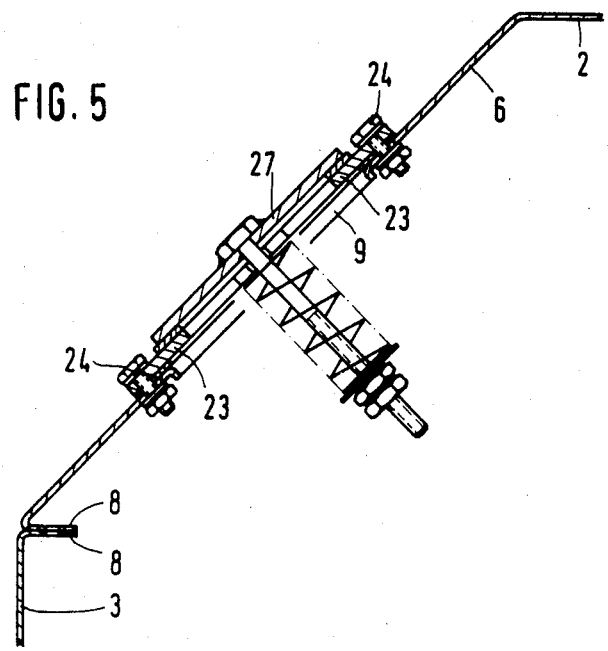
FIG. 5 is an enlarged view of a third corner portion of the median unit, showing the manner in which a pressure relief valve is installed in the shorter panel of a third section.

FIG. 5 shows the panel 6 which is located in the upper left-hand portion of the intermediate unit 13. This panel is sealingly connected with a closure 23 which carries a relief or safety valve 27 serving to ensure that the pressure in the interior of the cabin cannot rise above a preselected maximum value. Other types of valves can be used in lieu of the illustrated spring-biased valve 27.

Figure 6:
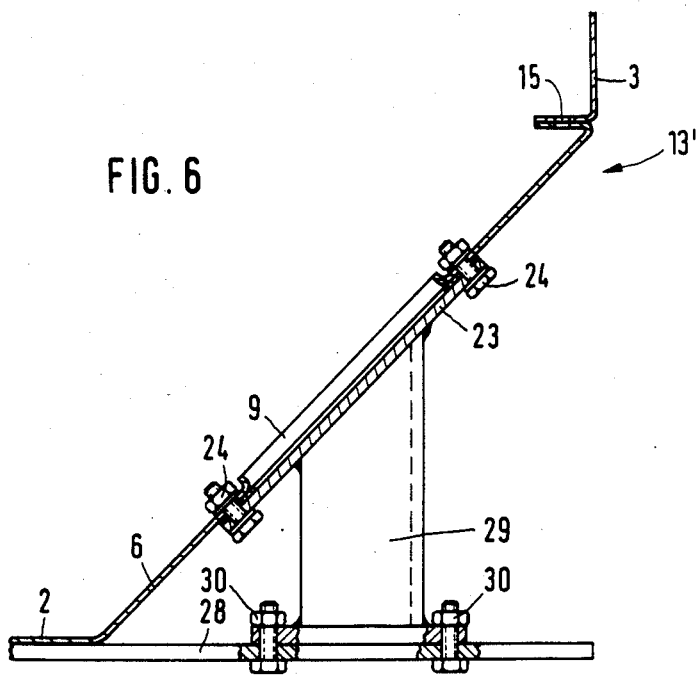
FIG. 6 is a view similar to that of FIG. 3 but showing the manner in which one of the units can be secured to a column on a platform in an underground excavation.

FIG. 6 shows a portion of a modified unit 13' wherein the panel 6 in the lower right-hand portion of the unit is sealingly connected with a closure 23 which is welded or otherwise secured to the upper end portion of an upright support or column 29. The lower end portion of the column 29 is separably affixed to a platform 28 which can replace the beams 20 of FIG. 2 or which can be placed on top of such beams. The means for separably affixing the column 29 to the platform 28 comprises a set of bolts and nuts 30 whose bolts extend through registering holes in the platform 28 and in an annular flange at the lower end of the column 29. The latter can constitute an integral part of the platform 28.

It is also possible to employ closures in the form of plates which are not connected to columns or other types of supports, to conduits, valves, cables and/or other parts, i.e., which merely serve to seal the openings 9 in the respective panels 6. For example, all four panels 6 in each of the two additional units 12, 14 of FIG. 2 can carry plate-like closures in order to ensure that little or no air can escape from the cabin by way of the respective openings 9.

The interior of the improved cabin can be maintained at a pressure which exceeds the pressure in the surrounding area. For example, a conduit 26 of the type shown in FIG. 4 can be used to connect the interior of the cabin with the outlet of a compressor which supplies air or another fluid at superatmospheric pressure. The valve 27 of FIG. 5 ensures that the pressure in the cabin cannot exceed a preselected value even if the compressor operates without interruptions. The conduit for admission of a pressurized fluid need not be connected to a separately installed compressor but can receive compressed air from the customary compressed air line or lines which are normally available in underground excavations. The valve 27 can be omitted if the cabin is designed to permit the escape of air at a certain rate which is less than the rate of admission of air from a compressed-air line or the like. For example, one of the closures 23 can be provided with a perferably adjustable flow restricting orifice or with a series of orifices which determine the rate of flow of air from the interior of the cabin. This obviates the need for the valve or valves 27. Furthermore, leakage of the fluid betwen the neighboring sections of a unit, between the neighboring units and/or between a unit and the adjacent sidewall 31 can be selected in such a way that the pressure in the interior of the cabin exceeds the pressure therearound but cannot rise above a preselected value. This obviates the need for discrete safety valves and renders it unnecessary to seal the gaps between neighboring sections of a unit and/or between neighboring units and/or between a unit and the corresponding sidewall with utmost precision.

If the cabin is used in an underground excavation, it is advisable to expel methane, light carburetted hydrogen gas and/or other undesirable or detrimental fluids from its interior by extensive circulation of air through the cabin before the latter is entered by a workman. If the cabin is not designed to afford access to workmen or other persons, its interior can be cleaned (by expelling methane or other deleterious fluids) by means of a fluid other than air, e.g., by a fluid which is supplied by a bottle or tank for a supply of pressurized inert gas or the like.

An important advantage of the improved cabin is that it is assembled of a small number of simple component parts which can be rapidly assembled at the locale of use or taken apart prior to transfer of the cabin to a different locale of use. Moreover, the weight of the assembled cabin is surprisingly small so that the cabin can be transferred in the interior of a mine or to another mine without even partial dismantling. Still further, the cabin is quite sturdy and can readily resist deformation during transport in fully assembled condition.

The number of units in a cabin can be selected practically at will and depends on the dimensions of the units, on the number and dimensions of parts which are to be stored in the cabin, whether or not the cabin is to be entered into by workmen and certain other considerations (such as the height and width of the excavation in which the cabin is to be assembled or into which the cabin is to be transported subsequent to partial or complete assembly outside of the excavation).

The stability of the cabin is highly satisfactory due to the aforediscussed design of the individual sections 2 and 3 as well as due to the provision of borders whose portions 7 and 8 can be secured to or separated from each other in a simple and time-saving manner. The borders including the portions 7 and 8 stiffen the individual sections as well as the units which are assembled of the sections 2, 3 and the cabin which includes a single unit and two sidewalls or two or more neighboring units plus two sidewalls. The stability of a cabin which comprises two or more neighboring units is enhanced still further (actually multiplied) by the aforediscussed orientation of sections in neighboring units, i.e., that the sections in one of the units are inverted by 180 degrees with reference to sections in the neighboring unit or units. Such orientation of sections in neighboring units ensures that the places where the sections of one unit are secured to each other are staggered with reference to such places in the neighboring unit or units, as considered in the circumferential direction of the units.

The feature that each of the smaller panels 6 can be provided with an opening 9 is desirable and advantageous because the sections 2, 3 of one unit can be used interchangeably with the sections of the other unit or units. The openings which are not needed are simply sealed by plain plate-like or otherwise configurated closures 23. The application of plain closures to certain panels 6 does not in any way affect the strength and/or other desirable characteristics of the respective sections, of the respective units and/or of the assembled cabin.

An advantage of openings 9 in the panels 6 of a cabin which is to receive the end of a cable or the ends of two or more cables is that the cable will normally be introduced through the opening 9 of a lower panel 6, i.e., of a panel which is close to the mine floor 21 (FIG. 1). Such cable need not be subjected to extensive flexing forces since it is merely bent through approximately 45 degrees in order to pass through the opening 9 of the panel 6 which is shown in FIG. 3. Heavy-duty cables for use in mines or for similar purposes are often very rigid so that extensive flexing is not only difficult but can damage the insulation around the conductor or conductors. It is clear that, if a cable is led along the roof of the underground excavation, it can be caused to enter the cabin by way of the opening in one of the upper panels 6 (corresponding to the panel 6 of FIG. 5).

The utilization of closures 23 (such as the one shown in FIG. 6) which are provided with separable or permanently attached columns 29 or other types of supports contributes to compactness of the cabin because the supports 29 are out of the way when the cabin is fully assembled. Moreover, the supports 29 are relatively short which reduces the overall weight and cost of the corresponding closures.

The relatively short inclined panels 6 exhibit the additional advantage that they render it possible to move the cabin closer to the mine face. This can be readily seen in FIG. 1 wherein the upper right-hand panel 6 is placed very close to the similarly inclined portion of the mine face 22 and thus allows for the placing of the entire cabin 1 into or close to the deepmost portion of the excavation. The upper left-hand panel 6 of FIG. 1 is ideally suited for the mounting of one or more relief or safety valves because such panel is remote from the mine face 22 so that the flow of fluid from the interior of the cabin 1 is not likely to be obstructed. As mentioned above, the cabin is preferably aerated prior to use to ensure the expulsion of all undesirable fluids which are likely to be found in a coal mine or in another underground excavation.

The relatively short panels 6 which are inclined with reference to the respective longer panels 4 and 5 exhibit other important advantages. For example, they contribute to much more pronounced stability of the respective sections and units. This is an additional reason why the openings 9 are preferably provided in the relatively small panels 6 because the stability of such panels is much more pronounced than that of the longer or larger panels 4 and 5. This will be readily appreciated by bearing in mind that all marginal portions of each opening 9 are closely adjacent to the borders (portions 7 and 8) of the respective smaller panels 6, i.e., close to the reinforced portions of such panels. It has been found that the provision of relatively large openings 9 does not unduly reduce the resistance of panels 6 to deforming stresses which develop in a unit when the cabin is in use or during transport of the assembled cabin. The dimensions of the openings 9 will be selected in such a way that they suffice for the introduction of bulkiest parts (e.g., large-diameter electric cables or large-diameter hydraulic or pneumatic conduits). Of course, at least some of the larger panels 4 and/or 5 can also be formed with openings if the provision of such openings in the larger panels is desirable under certain special circumstances.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

We claim:

1. An edifice, particularly a pressurized cabin for confinement of electrical equipment in underground excavations, comprising at least one circumferentially complete unit having four neighboring sections each of which comprises a longer panel and a shorter panel, as considered in the circumferential direction of the unit, the panels of each section making acute angles and the shorter panel of each section being adjacent to the longer panel of the neighboring section, each of said sections having a marginal portion provided with a border extending to one side of the respective section, the borders of neighboring sections having portions which are adjacent to each other; and means for securing said portions of the borders of neighboring sections to each other.

2. The edifice of claim 1, wherein the shorter panels of all of said sections have identical dimensions.

3. The edifice of claim 1, wherein each of said borders extends at least substantially all the way around the respective section.

4. The edifice of claim 1, further comprising two sidewalls flanking said unit and means for securing said sidewalls to the borders of said sections.

5. The edifice of claim 1, further comprising a second unit adjacent to one side of said one unit, the borders of sections in each of said units having second portions which are adjacent to each other and further comprising means for securing the second portions of said borders to each other.

6. The edifice of claim 5, wherein the sections of said second unit are inverted through 180 degrees with reference to the sections of said one unit.

7. The edifice of claim 1, wherein the shorter panel of at least one of said sections has an opening and further comprising a closure overlying said opening and means for securing said closure to the respective shorter panel.

8. The edifice of claim 7, further comprising a seal interposed between said one shorter panel and said closure to prevent leakage of fluids through said openings.

9. The edifice of claim 7, further comprising a cable extending through said closure and a fluidtight seal between said closure and said cable, said seal surrounding said cable and being secured to said closure.

10. The edifice of claim 7, further comprising a conduit extending through said closure and a fluidtight seal between said closure and said conduit, said seal surrounding said conduit and being provided on said closure.

11. The edifice of claim 10, wherein said conduit is a pneumatic conduit.

12. The edifice of claim 10, wherein said conduit is a hydraulic conduit.

13. The edifice of claim 7, further comprising a support secured to said closure externally of said unit.

14. The edifice of claim 1, further comprising supports provided on at least two of said shorter panels and a substantially plate-like partition resting on said supports.

15. The edifice of claim 14, wherein each of said supports includes at least one substantially triangular bracket on the respective shorter panel in the interior of said unit.

16. The edifice of claim 14, wherein said partition is a substantially horizontal floor and one of said longer panels is disposed below and is spaced apart from said floor.

17. The edifice of claim 14, wherein each of said shorter panels has a center and each of said supports includes two halves which are mirror symmetrical to each other with reference to a plane including the respective center.

18. The edifice of claim 1, wherein the dimensions of the longer panels of two of said sections deviate from the dimensions of the longer panels of the other two sections.

19. The edifice of claim 1, wherein two of said longer panels are substantially horizontal and the other two of said longer panels are substantially vertical, and further including at least one prop extending between said horizontal panels.

20. The edifice of claim 1, further comprising two additional units flanking said one unit.

* * * * *